US012094381B2

(12) United States Patent
Lee et al.

(10) Patent No.: US 12,094,381 B2
(45) Date of Patent: Sep. 17, 2024

(54) DISPLAY PANEL AND DISPLAY DEVICE INCLUDING THE SAME

(71) Applicant: Samsung Display Co., Ltd., Yongin-Si (KR)

(72) Inventors: Jungyu Lee, Seoul (KR); Joon-Chul Goh, Suwon-si (KR); Kanghee Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 45 days.

(21) Appl. No.: 17/828,305

(22) Filed: May 31, 2022

(65) Prior Publication Data

US 2023/0117423 A1 Apr. 20, 2023

(30) Foreign Application Priority Data

Oct. 19, 2021 (KR) ........................ 10-2021-0139325

(51) Int. Cl.
*G09G 3/20* (2006.01)

(52) U.S. Cl.
CPC ....... *G09G 3/20* (2013.01); *G09G 2310/0267* (2013.01); *G09G 2320/045* (2013.01)

(58) Field of Classification Search
CPC ........................... G09G 3/20; G09G 2320/045
See application file for complete search history.

(56) References Cited

U.S. PATENT DOCUMENTS

| | | | | |
|---|---|---|---|---|
| 2015/0106311 | A1* | 4/2015 | Birdwell | G06N 3/063 706/26 |
| 2017/0193356 | A1* | 7/2017 | Park | G06N 3/065 |
| 2017/0236498 | A1* | 8/2017 | Zhou | G09G 5/10 345/555 |
| 2017/0243531 | A1* | 8/2017 | Moon | G09G 3/2092 |
| 2017/0243548 | A1* | 8/2017 | Wang | G09G 3/20 |
| 2018/0232628 | A1* | 8/2018 | Park | G06N 3/063 |
| 2019/0131383 | A1* | 5/2019 | Frank | H01B 3/10 |
| 2019/0311256 | A1* | 10/2019 | Hack | H01L 27/1446 |
| 2020/0015754 | A1* | 1/2020 | Durand | H01B 11/06 |
| 2020/0175905 | A1* | 6/2020 | Yamazaki | G06N 3/04 |
| 2020/0234665 | A1* | 7/2020 | Chen | G09G 3/3677 |
| 2020/0281468 | A1* | 9/2020 | Dawson | A61B 5/24 |
| 2021/0158489 | A1* | 5/2021 | Watanabe | G09G 3/32 |

FOREIGN PATENT DOCUMENTS

KR 10-1997868 B1 7/2019

OTHER PUBLICATIONS

Kim et al., "Synergistic Improvement of Long-Term Plasticity in Photonic Synapses Using Ferroelectric Polarization in Hafnia-Based Oxide-Semiconductor Transistors", Advanced Materials 32.12 (2020): 1907826.

* cited by examiner

*Primary Examiner* — Sejoon Ahn
(74) *Attorney, Agent, or Firm* — Innovation Counsel LLP

(57) ABSTRACT

Provided is a display panel which may include a pixel array including a plurality of pixels connected to scan lines and data lines, a photonic synapse block including a plurality of photonic synapse elements, and a neuron block including a plurality of neuron elements electrically connected to the plurality of photonic synapse elements.

10 Claims, 9 Drawing Sheets

DISPLAY PANEL AND DISPLAY DEVICE INCLUDING THE SAME

CROSS-REFERENCE TO RELATED APPLICATION(S)

This application claims priority under 35 USC § 119 to Korean Patent Application No. 10-2021-0139325 filed on Oct. 19, 2021 in the Korean Intellectual Property Office (KIPO), the entire disclosure of which is incorporated by reference herein.

BACKGROUND

1. Field

Embodiments generally relate to a display device. More particularly, embodiments relate to a display device applied to various electronic apparatuses and a display panel included in the display device.

2. Description of the Related Art

As information technology develops, a demand for a display device for displaying an image is increasing. For example, the display device may be applied to various electronic apparatuses such as a smart phone, a digital camera, a notebook computer, a navigation system, a smart television, or the like.

Recently, artificial intelligence has been applied in various fields. The artificial intelligence may be implemented in software or hardware. In order to implement the artificial intelligence in hardware, a neuromorphic system that mimics a human nervous system is being studied.

The artificial intelligence may be used for image processing, deterioration prediction, or the like of the display device. In the display device, the neuromorphic system may be implemented as a neural processing unit (NPU). However, as the display device includes the neural processing unit, power consumption and cost of the display device may increase.

SUMMARY

Embodiments provide a display device in which a neuromorphic system is implemented with low power consumption and low cost.

A display panel according to an embodiment may include: a pixel array including a plurality of pixels connected to scan lines and data lines; a photonic synapse block including a plurality of photonic synapse elements, electrically connected to the pixel array; and a neuron block including a plurality of neuron elements, each of the plurality of neuron elements electrically connected to each of the plurality of photonic synapse elements.

In an embodiment, the photonic synapse block may be disposed between the pixel array and the neuron block.

In an embodiment, a photo conductivity of each of the plurality of photonic synapse elements may be fixed.

In an embodiment, data voltages, which are transmitted through the data lines, may be inputted to the photonic synapse block.

In an embodiment, the photonic synapse block may overlap the pixel array.

In an embodiment, the photonic synapse block may be disposed under the pixel array.

In an embodiment, the plurality of photonic synapse elements may include a plurality of first photonic synapse elements and a plurality of second photonic synapse elements which receive signals from the plurality of first photonic synapse elements as input signals.

In an embodiment, a photo conductivity of each of the plurality of first photonic synapse elements may change by an image displayed by the pixel array.

In an embodiment, a photo conductivity of each of the plurality of second photonic synapse elements may be fixed.

In an embodiment, a number of the plurality of second photonic synapse elements may be greater than a number of the plurality of first photonic synapse elements per a unit area of the pixel array.

In an embodiment, the plurality of first photonic synapse elements may sense an image displayed by the pixel array, and the plurality of second photonic synapse elements may perform a neural network operation based on the input signals.

In an embodiment, the pixel array may include a first pixel array which displays an image and a second pixel array which does not display the image, and the photonic synapse block may overlap the second pixel array.

In an embodiment, the photonic synapse block may be disposed under the second pixel array.

In an embodiment, a photo conductivity of each of the plurality of photonic synapse elements may change by a light emitted by the second pixel array.

In an embodiment, each of the plurality of photonic synapse elements may include a ferroelectric layer and a semiconductor layer disposed on the ferroelectric layer.

In an embodiment, the ferroelectric layer may include hafnium-zirconium oxide (HfZrO), and the semiconductor layer may include indium-gallium-zinc oxide (IGZO).

In an embodiment, each of the plurality of neuron elements may include an operational amplifier.

A display device according to an embodiment may include: a display panel which includes a pixel array including a plurality of pixels connected to scan lines and data lines, a photonic synapse block including a plurality of photonic synapse elements electrically connected to the pixel array, and a neuron block including a plurality of neuron elements, each of the plurality of neuron elements electrically connected to each of the plurality of photonic synapse elements; and a memory electrically connected to the neuron block.

In an embodiment, the memory may receive an output signal of the neuron block, and the photonic synapse block may receive an output signal of the memory.

In an embodiment, the display device may further include a driver configured to provide scan signals to the scan lines and providing data voltages to the data lines respectively, and the driver may include the memory.

In the display device according to the embodiments, the display panel may include the photonic synapse block and the neuron block, so that the neuromorphic system may be implemented in the display device with low power consumption and low cost.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Hereinafter, display panels and display devices in accordance with embodiments will be explained in detail with reference to the accompanying drawings.

Figure 1:
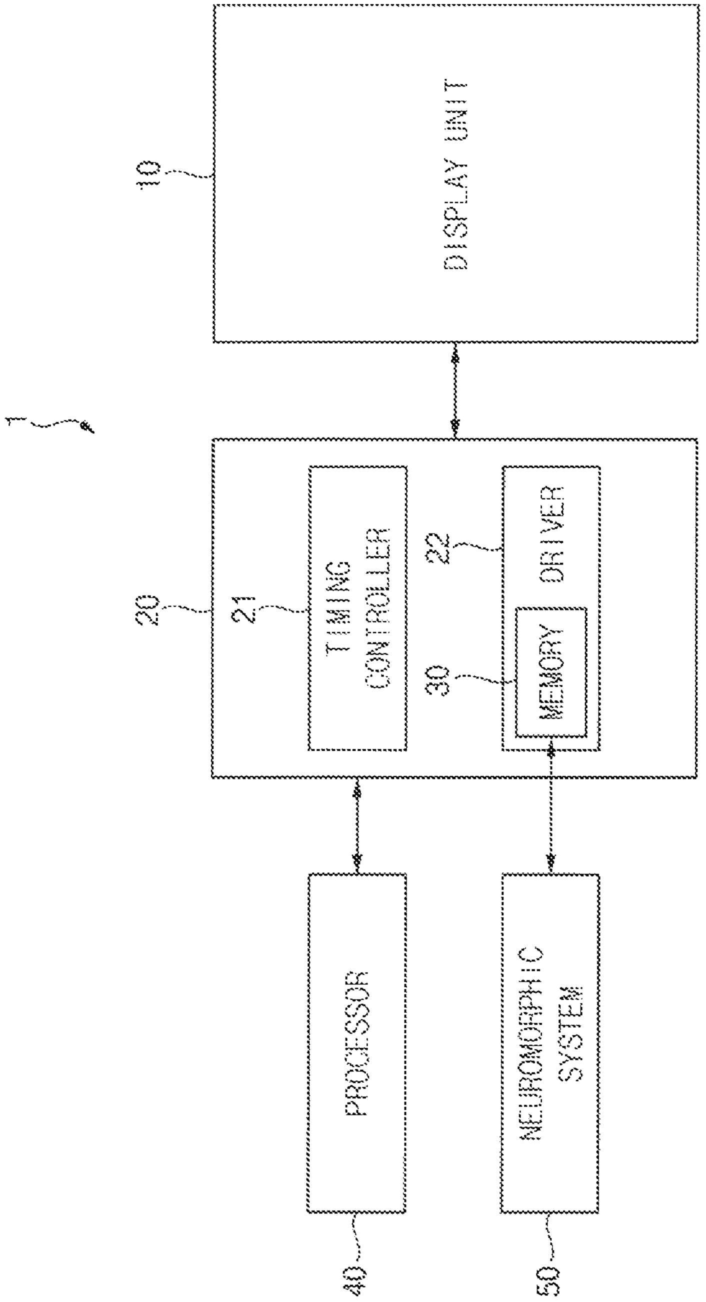
FIG. 1 is a block diagram illustrating a display device according to an embodiment.

FIG. 1 is a block diagram illustrating a display device 1 according to an embodiment.

Referring to FIG. 1, the display device 1 may include a display unit 10, a driving controller 20, a processor 40, and a neuromorphic system 50.

The processor 40 may control an operation of the driving controller 20. The processor 40 may provide image data to the driving controller 20. The processor 40 may include a central processing unit (CPU). In an embodiment, the processor 40 may be an application processor (AP) for mobile.

The driving controller 20 may convert the image data into data voltages, and provide the data voltages to the display unit 10. The driving controller 20 may include a timing controller 21 and a driver 22.

The timing controller 21 may generate data signals, a data control signal, and a scan control signal based on the image data.

The driver 22 may generate the data voltages based on the data signals and the data control signal. Further, the driver 22 may generate scan signals based on the scan control signal. In an embodiment, the driver 22 may include a data driver generating the data voltages and a scan driver generating the scan signals.

The display unit 10 may receive the data voltages and the scan signals from the driver 22. The display unit 10 may include a plurality of pixels that display an image. The pixels may emit light based on the data voltages and the scan signals.

The driver 22 may include a memory 30. The memory 30 may store data necessary for an operation of the driver 22 and an operation of the neuromorphic system 50. The memory 30 may include a volatile memory or a non-volatile memory. The volatile memory may include dynamic random access memory (DRAM), static random access memory (SRAM), mobile DRAM, or the like. The non-volatile memory may include erasable programmable read-only memory (EPROM), electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), or the like.

The neuromorphic system 50 may perform a neural network operation using an artificial intelligence. For example, the neuromorphic system 50 may perform image processing using the artificial intelligence, deterioration prediction using the artificial intelligence, or the like. The neuromorphic system 50 may include a photonic synapse block SB in FIG. 3 and a neuron block NB in FIG. 3, which will be described below. The neuromorphic system 50 may provide a signal to the memory 30, and may receive a signal from the memory 30.

Figure 2:
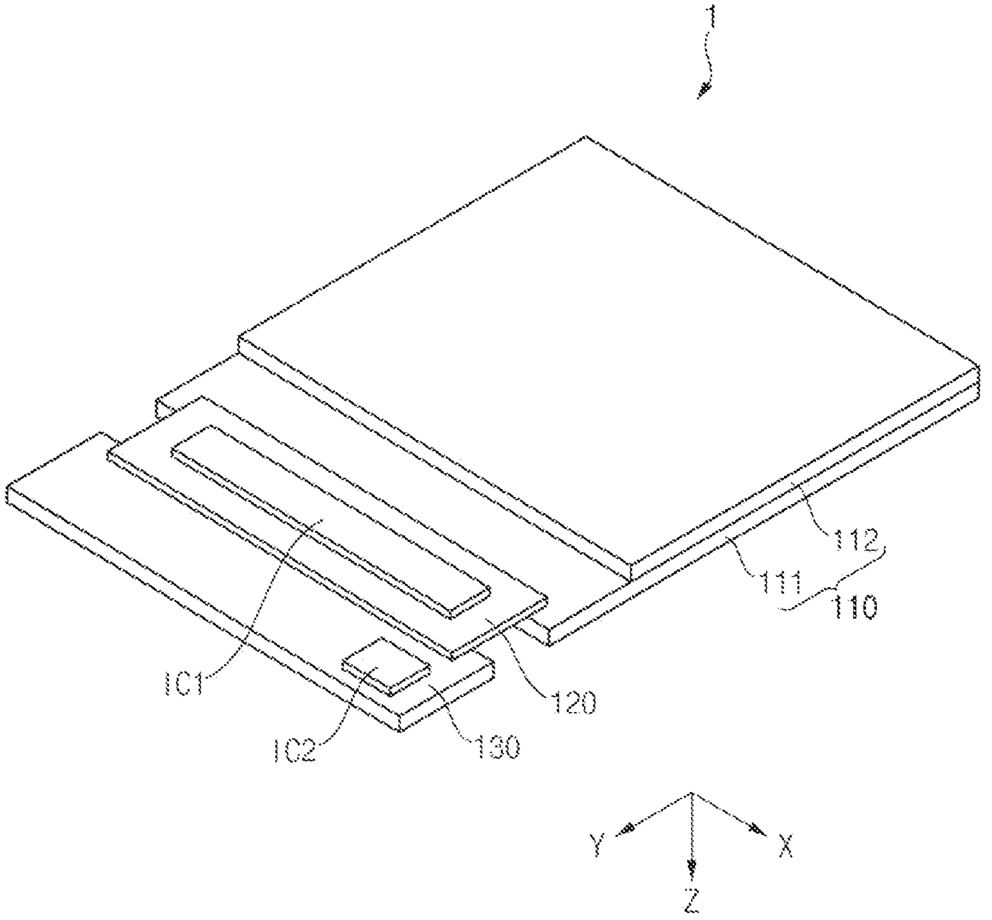
FIG. 2 is a perspective view illustrating the display device in FIG. 1.

FIG. 2 is a perspective view illustrating the display device 1 in FIG. 1.

Referring to FIG. 2, the display device 1 may include a display panel 110 in which the display unit 10 is defined, a flexible circuit film 120, and a printed circuit board 130.

The display panel 110 may include a first substrate 111 and a second substrate 112. The first substrate 111 may be a thin film transistor substrate including a plastic substrate or a glass substrate. The first substrate 111 may include a thin film transistor and a light emitting element connected to the thin film transistor.

In an embodiment, the driver 22 of the driving controller 20 may be mounted on the first substrate 111 in the form of an integrated circuit.

The second substrate 112 may be an encapsulation substrate including a plastic film, a glass film, or a protective film, or may be a window substrate. The second substrate 112 may protect the thin film transistor and the light emitting element included in the first substrate 111 from external moisture, oxygen, or the like.

The flexible circuit film 120 may be connected to the first substrate 111 of the display panel 110 and the printed circuit board 130. The flexible circuit film 120 may be bent. The flexible circuit film 120 may be implemented by a chip on film (COF) method, a chip on plastic (COP) method, or the like. The flexible circuit film 120 may include a base film including polyimide or the like and a plurality of lead lines disposed on the base film.

In an embodiment, the driving controller 20 may be mounted on the flexible circuit film 120 in the form of an integrated circuit IC1.

The printed circuit board 130 may be connected to the flexible circuit film 120. For example, the printed circuit board 130 may be a flexible printed circuit board (FPCB).

In an embodiment, the driving controller 20 and the processor 40 may be mounted on the printed circuit board 130 in the form of an integrated circuit IC2.

Figure 3:
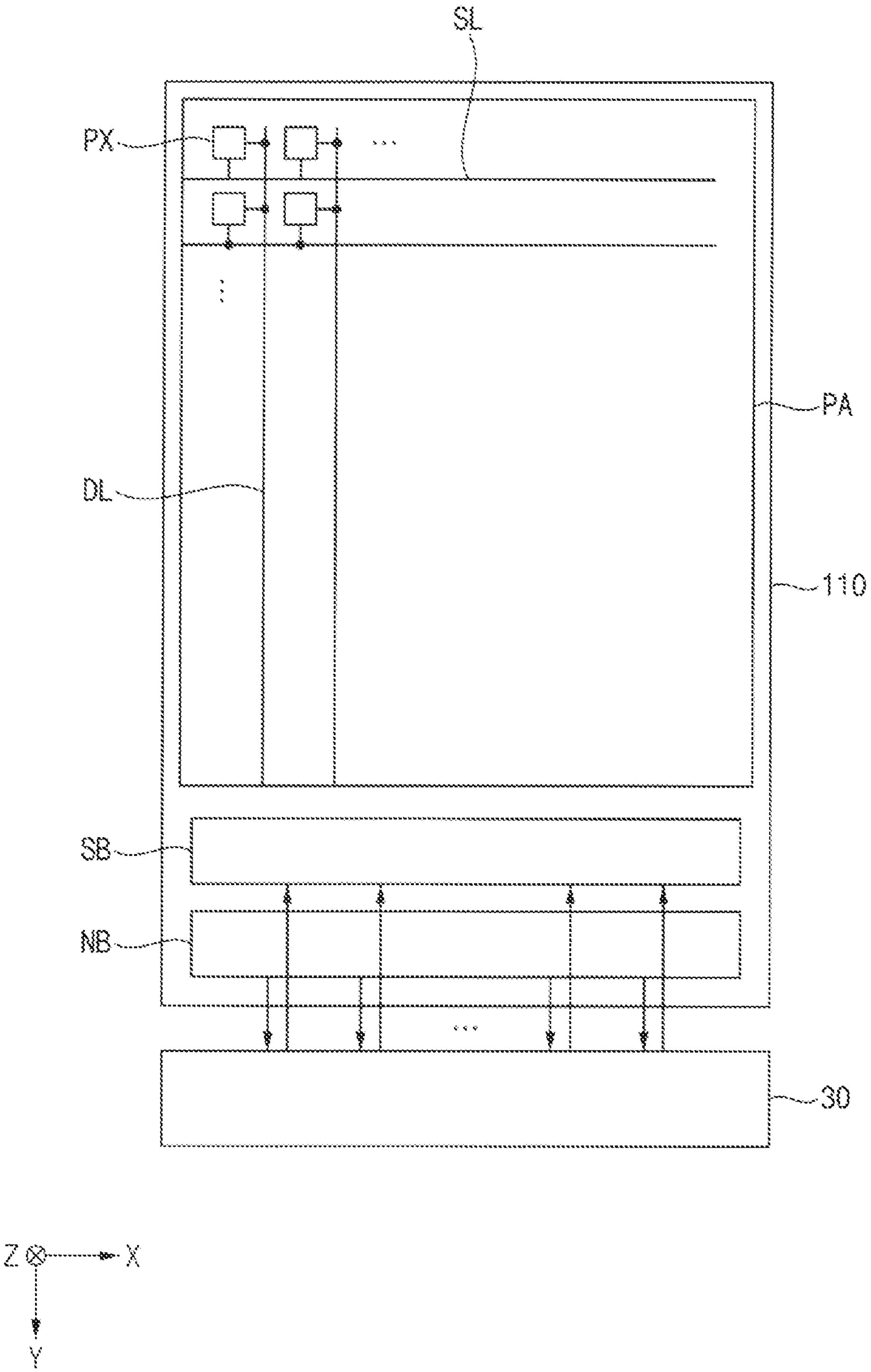
FIG. 3 is a plan view illustrating a display panel according to an embodiment.
Figure 4:
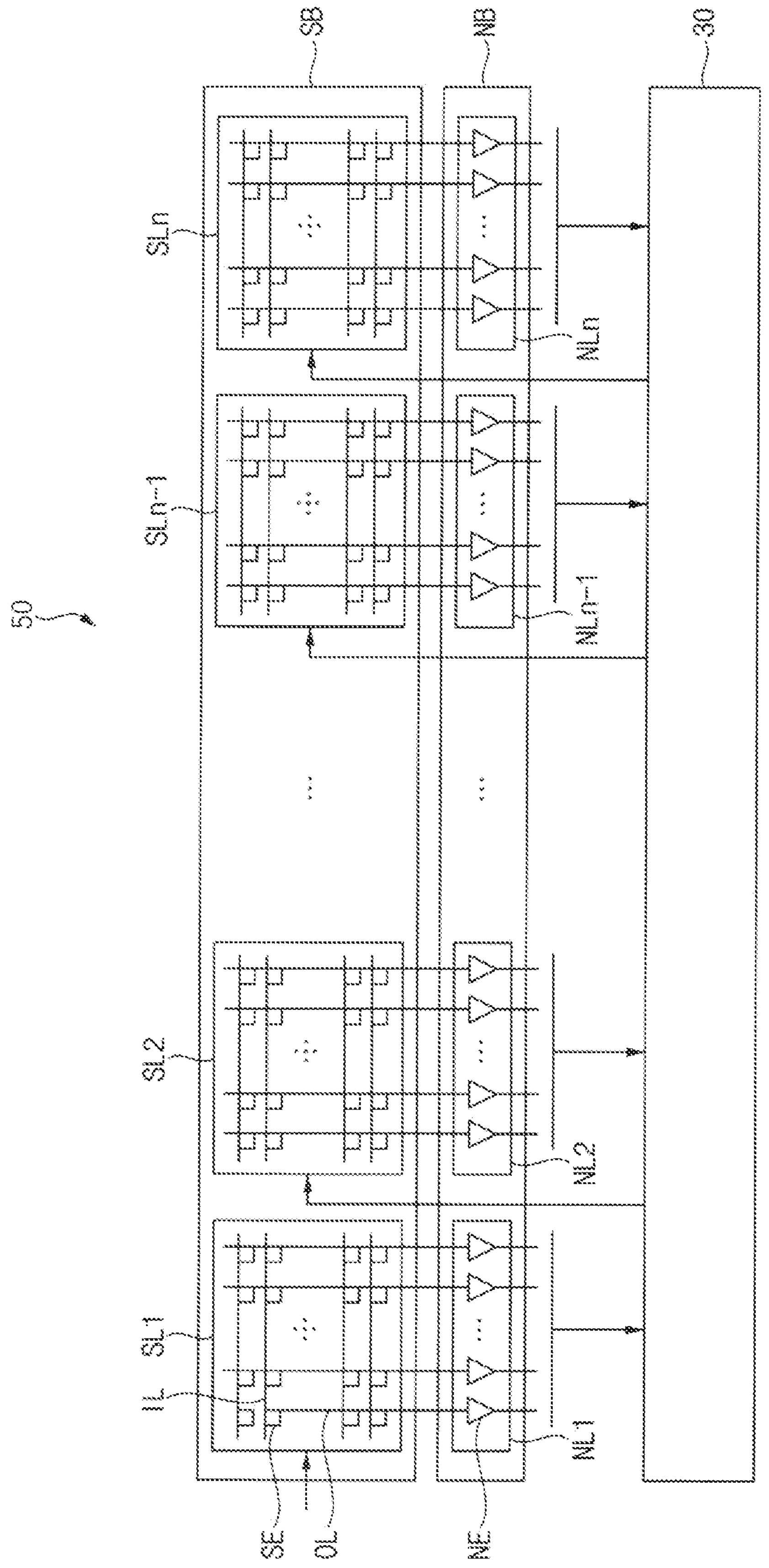
FIG. 4 is a block diagram illustrating a neuromorphic system according to an embodiment.

FIG. 3 is a plan view illustrating a display panel 110 according to an embodiment. FIG. 4 is a block diagram illustrating a neuromorphic system 50 according to an embodiment.

Referring to FIGS. 3 and 4, the display panel 110 may include a pixel array PA, a photonic synapse block SB, and a neuron block NB. The photonic synapse block SB and the neuron block NB may form the neuromorphic system 50.

The pixel array PA may include a plurality of pixels PX. The pixels PX may be connected to scan lines SL and data lines DL. The scan lines SL may extend in a first direction X, and may be arranged in a second direction Y crossing the first direction X. The data lines DL may extend in the second direction Y, and may be arranged in the first direction X. The scan lines SL may receive the scan signals from the scan driver of the driver 22, and the data lines DL may receive the data voltages from the data driver of the driver 22. The pixels PX may emit light based on the scan signals transmitted from the scan lines SL and the data voltages transmitted from the data lines DL. The pixel array PA may display an image based on light emitted from the pixels PX.

The photonic synapse block SB may not overlap the pixel array PA. The photonic synapse block SB may be disposed in the second direction Y from the pixel array PA. The photonic synapse block SB may be disposed between the pixel array PA and the neuron block NB in a plan view.

As depicted in FIG. 4, the photonic synapse block SB may include a plurality of photonic synapse elements SE. Each of the photonic synapse elements SE may be connected to an input line IL and an output line OL. Each of the photonic synapse elements SE may be turned on or turned off based on an electrical signal. Each of the photonic synapse elements SE may perform a neural network operation based on an input signal transmitted from the input line IL, and may provide an operation result to the output line OL. In an embodiment, each of the photonic synapse elements SE may generate an output signal by multiplying the input signal by a weight.

A photoconductivity of each of the photonic synapse elements SE may be fixed. The photo conductivity of the photonic synapse element SE may correspond to the weight for the neural network operation. The photo conductivity of the photonic synapse element SE may be fixed when the display panel 110 is manufactured. The photo conductivity of the photonic synapse element SE may correspond to a weight obtained by learning using artificial intelligence before the display panel 110 is manufactured.

In an embodiment, the photo conductivity of the photonic synapse element SE may be set by irradiating the photonic synapse element SE with ultraviolet light. For example, the photo conductivity of the photonic synapse element SE may be set based on the number of times of irradiation of ultraviolet light.

The neuron block NB may be disposed in the second direction Y from the photonic synapse block SB. The neuron block NB may include a plurality of neuron elements NE. The neuron elements NE may be electrically connected to the photonic synapse elements SE. Each of the neuron elements NE may be connected to the output line OL. Each of the neuron elements NE may accumulate the operation result transmitted through the output line OL, and may provide an accumulated operation result to the memory 30.

In an embodiment, each of the neuron elements NE may include an operational amplifier (op-amp).

The memory 30 may be electrically connected to the neuromorphic system 50. That is, the memory 30 may be electrically connected to the neuron block NB. The memory 30 may receive output signals of the neuron block NB, and may provide signals generated based on the output signals of the neuron block NB to the photonic synapse block SB. In other words, the photonic synapse block SB may receive output signals of the memory 30.

In an embodiment, as depicted in FIG. 4, the photonic synapse block SB may include a plurality of photonic synapse layers SL1, SL2, . . . , SLn−1, SLn, and the neuron block NB may include a plurality of neuron layers NL1, NL2, . . . , NLn−1, NLn. Each of the photonic synapse layers SL1, SL2, . . . , SLn−1, SLn may include a plurality of photonic synapse elements SE, and each of the neuron layers NL1, NL2, . . . , NLn−1, NLn may include a plurality of neuron elements NE.

An output signal of a k-th (k is a natural number) neuron layer NLk may be transmitted to a(k+1)-th photonic synapse layer SLk+1 through the memory 30. For example, an output signal of a first neuron layer NL1 may be transmitted to a second photonic synapse layer SL2 through the memory 30, and an output signal of an (n−1)-th neuron layer NLn−1 may be transmitted to an n-th photonic synapse layer SLn through the memory 30.

In an embodiment, the neuromorphic system 50 may perform an image processing operation using the data voltages provided to the pixel array PA. The image processing operation may include object detection, segmentation, motion estimation and motion compensation (MEMC) deblur, or the like.

In an embodiment, the data voltages transmitted by the data lines DL may be inputted to the photonic synapse block SB. For example, the data voltages may be sampled in units of n scan lines SL, and the sampled data voltages may be provided to the photonic synapse block SB.

In the embodiment described with reference to FIG. 3, the display panel 110 may include the photonic synapse block SB and the neuron block NB, so that the neuromorphic system 50 may be implemented in the display device 1 with low power consumption and low cost. Further, the image processing may be performed using the neuromorphic system 50, so that an image quality of the display device 1 may be improved.

Figure 5:
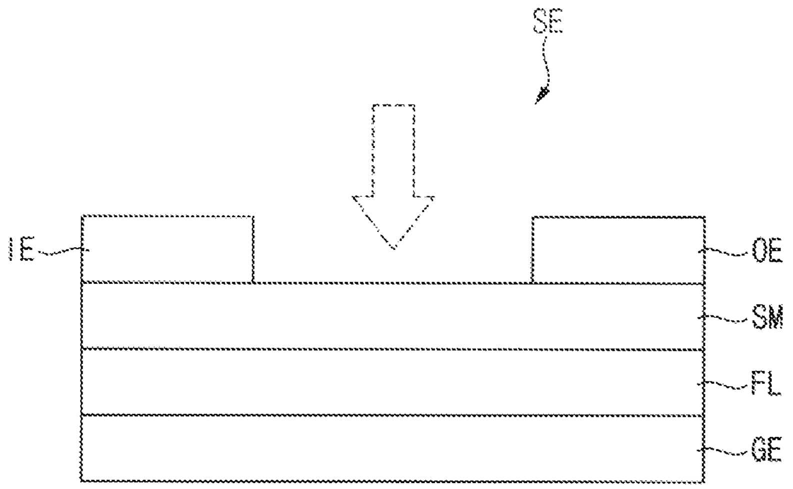
FIG. 5 is a cross-sectional view illustrating a photonic synapse element according to an embodiment.

FIG. 5 is a cross-sectional view illustrating a photonic synapse element SE according to an embodiment.

Referring to FIG. 5, the photonic synapse element SE may include a ferroelectric layer FL, a semiconductor layer SM, an input electrode IE, an output electrode OE, and a gate electrode GE. In an embodiment, the ferroelectric layer FL may include hafnium-zirconium oxide (HfZrO).

The semiconductor layer SM may be disposed on the ferroelectric layer FL. The semiconductor layer SM may include an oxide semiconductor. In an embodiment, the semiconductor layer SM may include indium-gallium-zinc oxide (IGZO).

The ferroelectric layer FL and the semiconductor layer SM may be formed by an atomic layer deposition. When an optical stimulation by light such as ultraviolet light, visible light, or the like is applied to the semiconductor layer SM from the outside, the ferroelectric layer FL may maintain polarization characteristics without external electrical stimulation. Accordingly, the photonic synapse element SE may control current, and may store photoconductivity. The photonic synapse element SE driven by the optical stimulation may have a driving speed faster than that of an electronic synaptic element, such as a memristor or the like, driven by an electrical stimulation, and may have a power consumption lower than that of the electronic synaptic element.

The input electrode IE and the output electrode OE may be disposed on the semiconductor layer SM. In an embodiment, the input electrode IE and the output electrode OE may include aluminum (Al). The input electrode IE may receive the input signal transmitted from the input line IL, and the output electrode OE may transmit the output signal to the output line OL.

The gate electrode GE may be disposed under the ferroelectric layer FL. In an embodiment, the gate electrode GE may include titanium nitride (TiN).

Figure 6:
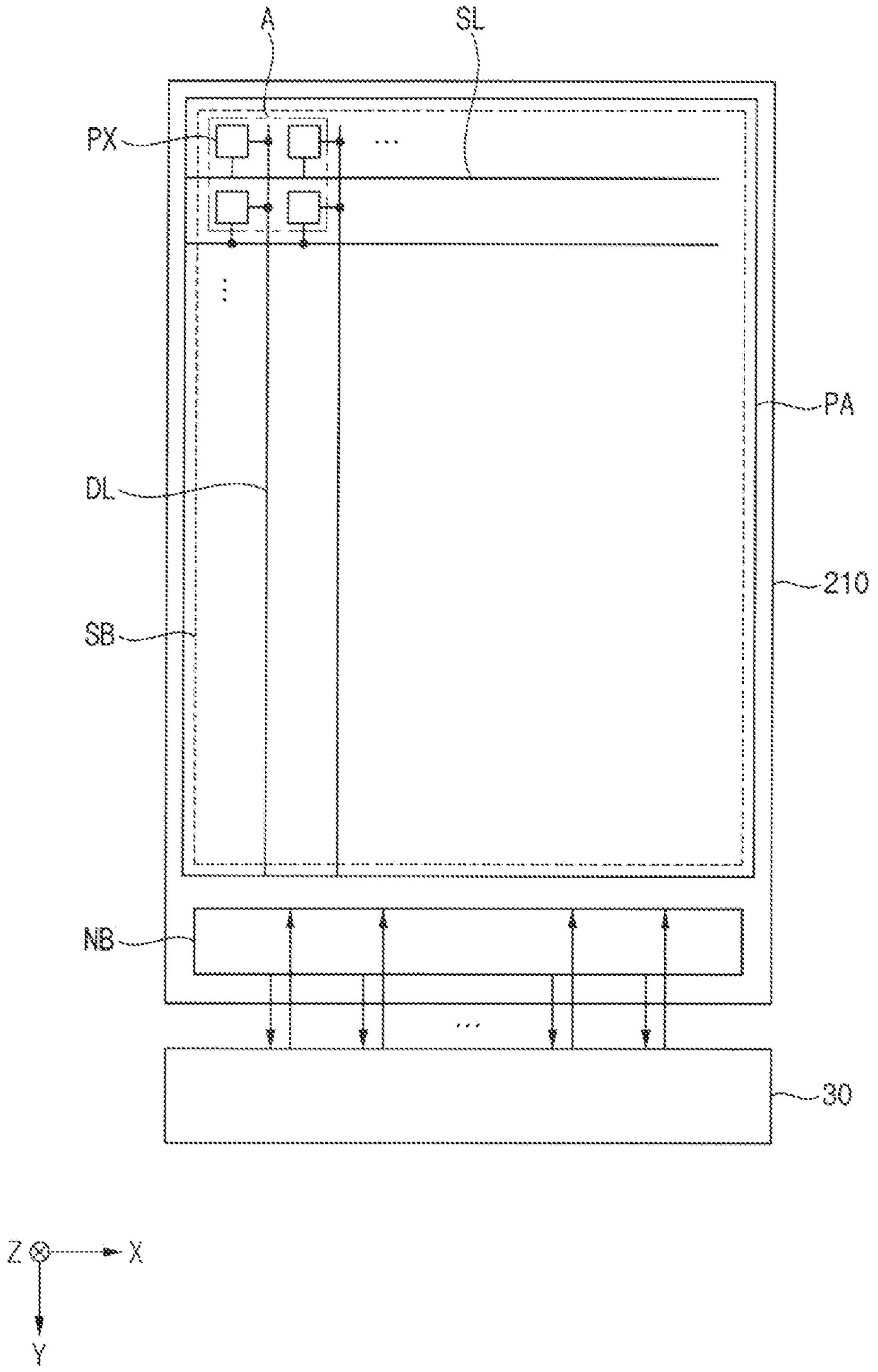
FIG. 6 is a plan view illustrating a display panel according to an embodiment.
Figure 7:
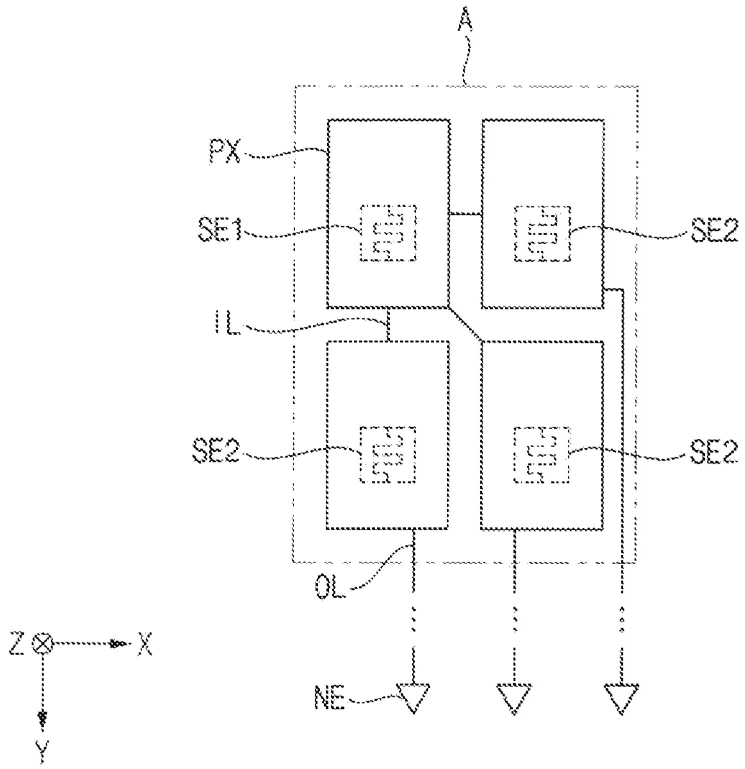
FIG. 7 is a plan view illustrating an area A and a portion of a neuron block in FIG. 6.
Figure 8:
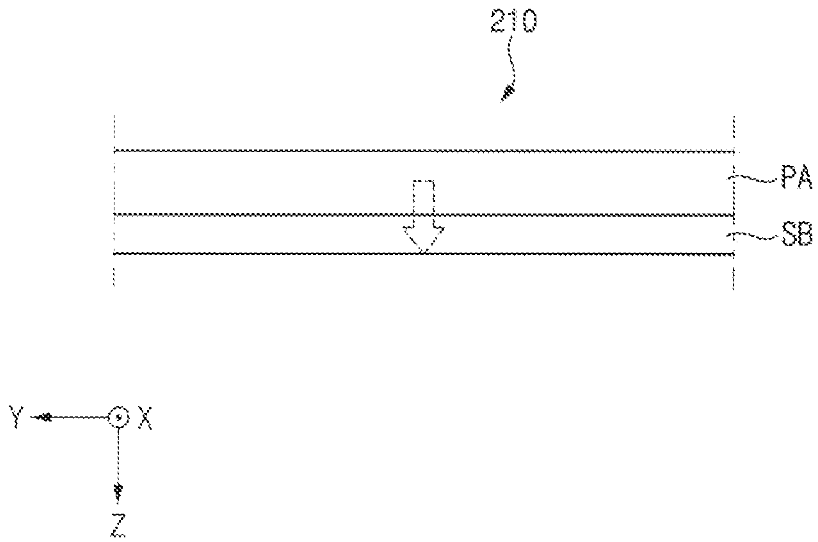
FIG. 8 is a cross-sectional view illustrating the display panel in FIG. 6.

FIG. 6 is a plan view illustrating a display panel 210 according to an embodiment. FIG. 7 is a plan view illustrating an area A and a portion of a neuron block NB in FIG. 6. FIG. 8 is a cross-sectional view illustrating the display panel 210 in FIG. 6.

Referring to FIGS. 6, 7, and 8, the display panel 210 may include a pixel array PA, a photonic synapse block SB, and a neuron block NB. The photonic synapse block SB and the neuron block NB may form the neuromorphic system 50.

Descriptions of components of the display panel 210 described with reference to FIGS. 6 to 8, which are substantially the same as or similar to those of the display panel 110 described with reference to FIG. 3, will be omitted.

The pixel array PA may include a plurality of pixels PX. The pixels PX may be connected to the scan lines SL and the data lines DL. The pixels PX may emit light based on the scan signals transmitted from the scan lines SL and the data voltages transmitted from the data lines DL. The pixel array PA may display an image based on light emitted from the pixels PX.

The photonic synapse block SB may overlap the pixel array PA. In an embodiment, the photonic synapse block SB may be disposed under the pixel array PA. The photonic synapse block SB may be disposed in a third direction Z crossing the first direction X and the second direction Y from the pixel array PA.

The photonic synapse block SB may include a plurality of photonic synapse elements SE. The photonic synapse elements SE may include a plurality of first photonic synapse elements SE1 and a plurality of second photonic synapse elements SE2. Each of the second photonic synapse elements SE2 may receive a signal from each of the first photonic synapse elements SE1 as an input signal.

The number of the second photonic synapse elements SE2 may be greater than the number of the first photonic synapse elements SE1. One first photonic synapse element SE1 may be disposed per a unit area of the pixel array PA. In an embodiment, as illustrated in FIG. 7, one first photonic synapse element SE1 and a plurality of second photonic synapse elements SE2 may be disposed per a unit area of the pixel array PA including 2×2 pixels PX. That is, each of the plurality of second photonic synapse elements SE2 may receive a signal from the same first photonic synapse element SE1. However, the present disclosure is not limited thereto, and in another embodiment, one first photonic synapse element SE1 may be disposed per a unit area of the pixel array PA including 3×3 pixels PX or a unit area of the pixel array PA including 4×4 pixels PX.

Each of the first photonic synapse elements SE1 may be connected to the input line IL. Each of the first photonic synapse elements SE1 may be turned on or turned off based on an optical signal. Each of the first photonic synapse elements SE1 may provide an output signal to the input line IL.

A photo conductivity of each of the first photonic synapse elements SE1 may be variable. The photo conductivity of the first photonic synapse element SE1 may change by an image displayed by the pixel array PA. The pixel array PA may emit light in the third direction Z, and the photo conductivity of the first photonic synapse element SE1 may change by the light emitted from the pixel array PA.

In an embodiment, the photo conductivity of the first photonic synapse element SE1 may change by visible light. For example, the photo conductivity of the first photonic synapse element SE1 may be set based on the number of times of irradiation of visible light.

The first photonic synapse elements SE1 may sense an image displayed by the pixel array PA. Since the photo conductivity of the first photonic synapse element SE1 changes by the image displayed by the pixel array PA, the first photonic synapse element SE1 may generate an output signal including information related to the generation of light in a unit area of the pixel array PA.

Each of the second photonic synapse elements SE2 may be connected to the input line IL and the output line OL. Each of the second photonic synapse elements SE2 may be turned on or turned off based on an electrical signal. Each of the second photonic synapse elements SE2 may perform a neural network operation based on an input signal transmitted from the input line IL, and may provide an operation result to the output line OL. In an embodiment, each of the second photonic synapse elements SE2 may generate the output signal by multiplying the input signal by a weight.

A photo conductivity of each of the second photonic synapse elements SE2 may be fixed. The photo conductivity of the second photonic synapse element SE2 may be fixed when the display panel 210 is manufactured. The photo conductivity of the second photonic synapse element SE2 may correspond to a weight obtained by learning using artificial intelligence before the display panel 210 is manufactured.

In an embodiment, the photo conductivity of the second photonic synapse element SE2 may be set by irradiating the second photonic synapse element SE2 with ultraviolet light. For example, the photo conductivity of the second photonic synapse element SE2 may be set based on the number of times of irradiation of ultraviolet light.

The second photonic synapse elements SE2 may perform a neural network operation based on input signals corresponding to the output signals of the first photonic synapse elements SE1. Since the photo conductivity of the second photonic synapse element SE2 is fixed, the second photonic synapse element SE2 may perform a neural network operation based on a weight corresponding to the fixed photo conductivity.

The neuron block NB may be disposed in the second direction Y from the photonic synapse block SB. The neuron block NB may include a plurality of neuron elements NE. The neuron elements NE may be electrically connected to the second photonic synapse elements SE2. Each of the neuron elements NE may be connected to the output line OL. Each of the neuron elements NE may accumulate the operation result transmitted through the output line OL, and may provide an accumulated operation result to the memory 30.

The memory 30 may be electrically connected to the neuron block NB. The memory 30 may receive output signals of the neuron block NB, and may provide signals generated based on the output signals of the neuron block NB to the photonic synapse block SB. In other words, the photonic synapse block SB may receive output signals of the memory 30.

In an embodiment, the neuromorphic system 50 may perform a deterioration prediction operation using an image displayed by the pixel array PA. A stress may be calculated using an image displayed by the pixel array PA, and deterioration of the pixels PX may be predicted based on the stress.

In the embodiment described with reference to FIGS. 6, 7, and 8, the display panel 210 may include the photonic synapse block SB and the neuron block NB, so that the neuromorphic system 50 may be implemented in the display device 1 with low power consumption and low cost. Further, deterioration prediction may be performed using the neuromorphic system 50, so that an image quality of the display device 1 may be improved by compensating deterioration of the pixels PX.

Figure 9:
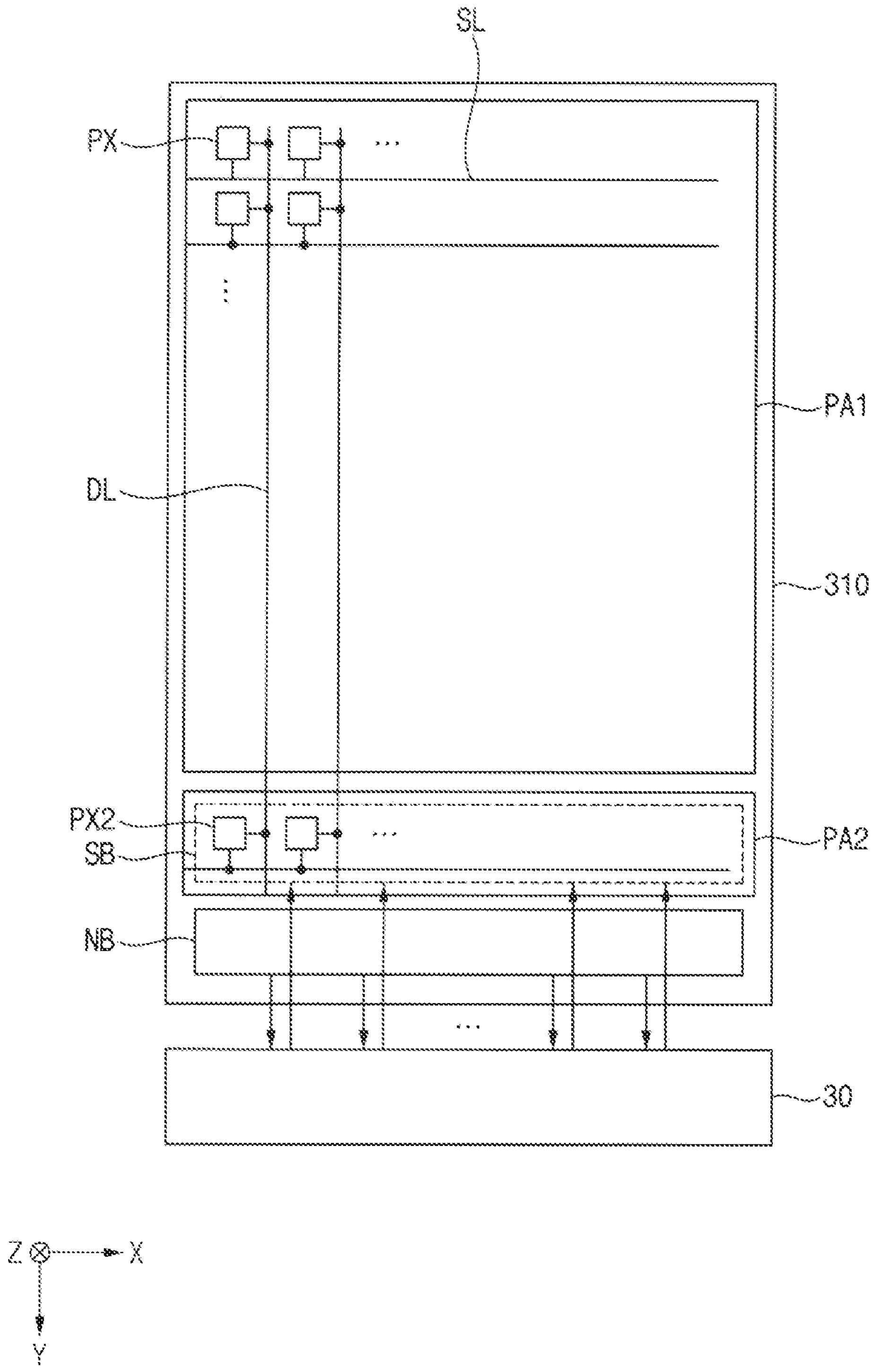
FIG. 9 is a plan view illustrating a display panel according to an embodiment.
Figure 10:
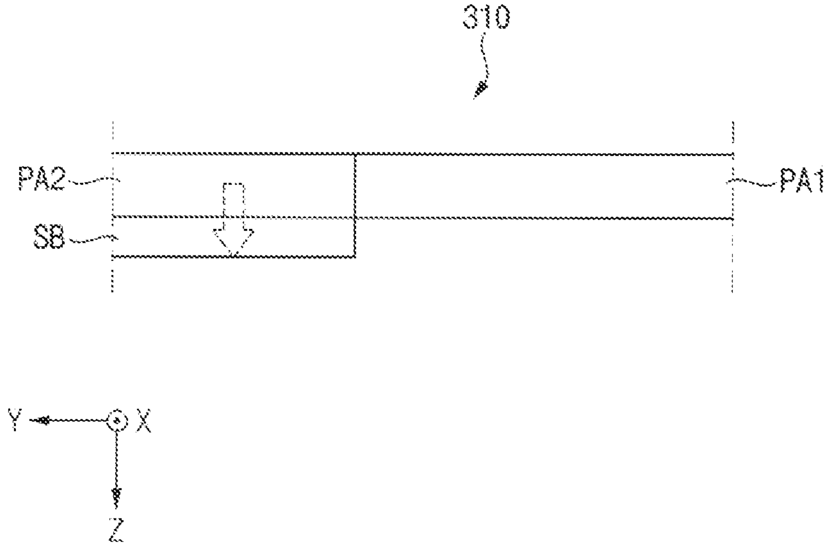
FIG. 10 is a cross-sectional view illustrating the display panel in FIG. 9.

FIG. 9 is a plan view illustrating a display panel 310 according to an embodiment. FIG. 10 is a cross-sectional view illustrating the display panel 310 in FIG. 9.

Referring to FIGS. 9 and 10, the display panel 310 may include a first pixel array PA1, a second pixel array PA2, a photonic synapse block SB, and a neuron block NB. The photonic synapse block SB and the neuron block NB may form the neuromorphic system 50. Descriptions of components of the display panel 310 described with reference to FIGS. 9 and 10, which are substantially the same as or similar to those of the display panel 110 described with reference to FIG. 3, will be omitted.

The first pixel array PA1 may include a plurality of first pixels PX. The first pixels PX may be connected to the scan lines SL and the data lines DL. The first pixels PX may emit light based on the scan signals transmitted from the scan lines SL and the data voltages transmitted from the data lines DL. The first pixel array PA1 may display an image based on light emitted from the first pixels PX.

The second pixel array PA2 may be disposed in the second direction Y from the first pixel array PA1. The second pixel array PA2 may include a plurality of second pixels PX2. The second pixels PX2 may be connected to the scan lines SL and the data lines DL. The second pixels PX2 may emit light based on the scan signals transmitted from the scan lines SL and the data voltages transmitted from the data lines DL. The light emitted from the second pixels PX2 may be provided to the photonic synapse block SB. The second pixel array PA2 may not display an image.

As depicted in FIG. 10, the photonic synapse block SB may overlap the second pixel array PA2. In an embodiment, the photonic synapse block SB may be disposed under the second pixel array PA2. That is, the photonic synapse block SB may not overlap the first pixel array PA1. The photonic synapse block SB may be disposed in the third direction Z from the second pixel array PA2.

The photonic synapse block SB may include a plurality of photonic synapse elements SE. Each of the photonic synapse elements SE may be connected to the input line IL and the output line OL. Each of the photonic synapse elements SE may be turned on or turned off based on an optical signal or an electrical signal. Each of the photonic synapse elements SE may perform a neural network operation based on an input signal transmitted from the input line IL, and may provide an operation result to the output line OL. In an embodiment, each of the photonic synapse elements SE may generate an output signal by multiplying the input signal by a weight.

A photo conductivity of each of the photonic synapse elements SE may be variable. The photo conductivity of the photonic synapse element SE may change by light emitted from the second pixel array PA2. The second pixel array PA2 may emit light in the third direction Z, and the photo conductivity of the photonic synapse element SE may change by the light emitted from the second pixel array PA2.

In an embodiment, the photo conductivity of the photonic synapse element SE may change by visible light. For example, the photo conductivity of the photonic synapse element SE may be set based on the number of times of irradiation of visible light.

The photonic synapse elements SE may sense the light emitted from the second pixel array PA2. Since the photoconductivity of the photonic synapse element SE change by the light emitted from the second pixel array PA2, the weight of the photonic synapse element SE may change depending on the light emitted from the second pixel array PA2.

The neuron block NB may be disposed in the second direction Y from the photonic synapse block SB. The neuron block NB may include a plurality of neuron elements NE. The neuron elements NE may be electrically connected to the photonic synapse elements SE. Each of the neuron elements NE may be connected to the output line OL. Each of the neuron elements NE may accumulate the operation result transmitted through the output line OL, and may provide an accumulated operation result to the memory 30.

The memory 30 may be electrically connected to the neuron block NB. The memory 30 may receive output signals of the neuron block NB, and may provide signals generated based on the output signals of the neuron block NB to the photonic synapse block SB. In other words, the photonic synapse block SB may receive output signals of the memory 30.

The neuromorphic system 50 may change or update a weight of a neural network by using the light emitted from the second pixel array PA2. In driving the display device 1, one frame period may include a porch period in which the data voltages are not applied to the first pixel array PA1. As the data voltages are applied to the second pixel array PA2 in the porch period, the second pixel array PA2 may emit light in the porch period, and the photo conductivities of the photonic synapse elements SE may change.

In the embodiment described with reference to FIGS. 9 and 10, the display panel 310 may include the photonic synapse block SB and the neuron block NB, so that the neuromorphic system 50 may be implemented in the display device 1 with low power consumption and low cost. Further, the weight of the neural network may be changed or updated after the display panel 310 is manufactured, so that a performance of the display device 1 may be improved.

The display panel and the display device according to the embodiments may be applied to a display device included in a computer, a notebook, a mobile phone, a smartphone, a smart pad, a PMP, a PDA, an MP3 player, or the like.

Although the display panels and the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display panel, comprising:

a pixel array including a plurality of pixels connected to scan lines and data lines;

a photonic synapse block including a plurality of photonic synapse layers, and electrically connected to the pixel array, each of the plurality of photonic synapse layers comprising a plurality of sets of photonic synapse elements; and a neuron block including a plurality of neuron layers, each of the plurality of neuron layers comprising a plurality of neuron elements, wherein each of the plurality of sets of photonic synapse elements comprises a plurality of photonic synapse elements connected to a same input line, and wherein each of the plurality of neuron elements in the each of the plurality of neuron layers is electrically connected to the each of the plurality of sets of photonic synapse elements in the each of the plurality of photonic synapse layers.

2. The display panel of claim 1, wherein the photonic synapse block is disposed between the pixel array and the neuron block in a plan view.

3. The display panel of claim 2, wherein a photo conductivity of each of the plurality of photonic synapse elements is fixed.

4. The display panel of claim 2, wherein data voltages, which are transmitted through the data lines, are inputted to the photonic synapse block.

5. The display panel of claim 1, wherein each of the plurality of photonic synapse elements includes a ferroelectric layer and a semiconductor layer disposed on the ferroelectric layer.

6. The display panel of claim 5, wherein the ferroelectric layer includes hafnium-zirconium oxide (HfZrO), and wherein the semiconductor layer includes indium-gallium-zinc oxide (IGZO).

7. The display panel of claim 1, wherein the each of the plurality of neuron elements includes an operational amplifier.

8. A display device, comprising:

a display panel which includes a pixel array including a plurality of pixels connected to scan lines and data lines, a photonic synapse block including a plurality of photonic synapse layers and electrically connected to the pixel array, and a neuron block including a plurality of neuron layers; and a memory electrically connected to the neuron block, wherein each of the plurality of neuron layers comprises a plurality of neuron elements, wherein each of the plurality of photonic synapse layers comprises a plurality of sets of photonic synapse elements, each of the plurality of sets of photonic synapse elements comprising a plurality of photonic synapse elements connected to a same input line, and wherein each of the plurality of neuron elements in the each of the plurality of neuron layers is electrically connected to the each of the plurality of sets of photonic synapse elements in the each of the plurality of photonic synapse layers.

9. The display device of claim 8, wherein the memory receives an output signal of the neuron block, and wherein the photonic synapse block receives an output signal of the memory.

10. The display device of claim 8, further comprising:

a driver configured to provide scan signals to the scan lines and data voltages to the data lines respectively, wherein the driver includes the memory.

* * * * *